Nov. 1, 1960 E. P. SPRINKLE 2,958,175
SELF-PROPELLED CORN TOPPING DEVICE
Filed Sept. 30, 1957 4 Sheets-Sheet 1

Elbert P. Sprinkle
INVENTOR.

BY Clarence A. O'Brien
and Harvey B. Jacobson
Attorneys

Elbert P. Sprinkle
INVENTOR.

Nov. 1, 1960  E. P. SPRINKLE  2,958,175
SELF-PROPELLED CORN TOPPING DEVICE
Filed Sept. 30, 1957  4 Sheets-Sheet 3

Elbert P. Sprinkle
INVENTOR.

BY
Attorneys

Nov. 1, 1960  E. P. SPRINKLE  2,958,175
SELF-PROPELLED CORN TOPPING DEVICE
Filed Sept. 30, 1957  4 Sheets-Sheet 4
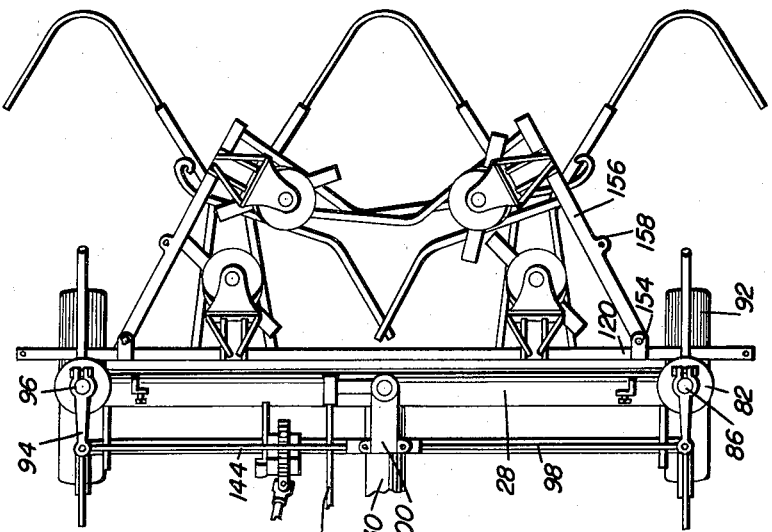
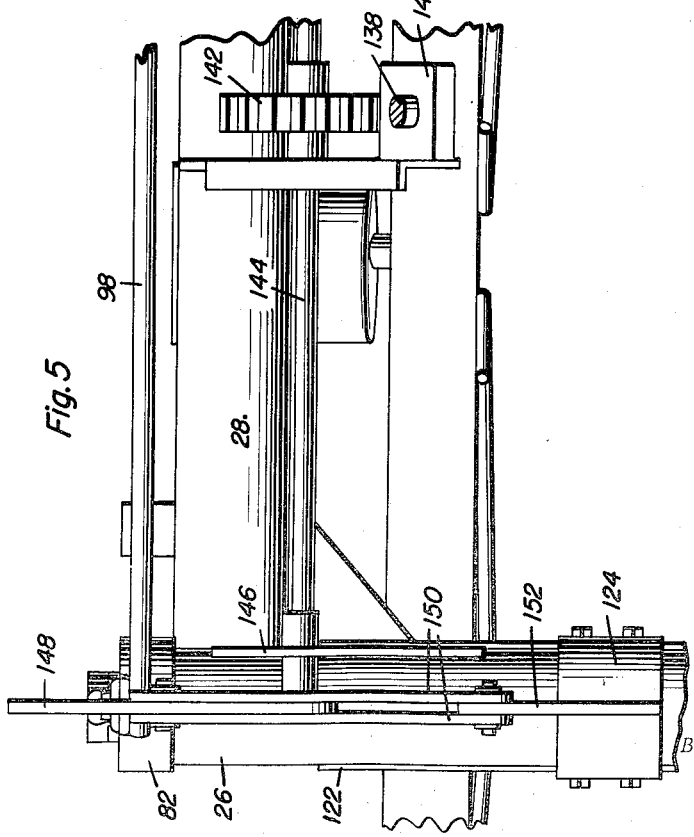
Elbert P. Sprinkle
INVENTOR.

United States Patent Office 2,958,175
Patented Nov. 1, 1960

2,958,175

SELF-PROPELLED CORN TOPPING DEVICE

Elbert P. Sprinkle, R.F.D. 1, Walton, Ind.

Filed Sept. 30, 1957, Ser. No. 687,157

4 Claims. (Cl. 56—25.4)

This invention relates generally to agricultural implements, and more specifically to a corn topping machine for topping off the upper ends of cornstalks.

In the agricultural industry when growing corn, it is sometimes necessary and desirable to remove the stalk of the corn just above the uppermost ear, in order that the corn may dry quicker, the stalks stand better, and the amount of fodder that will have to go through a corn picker, reduced.

In previous types of agricultural implements known heretofore in the art, the driver of the cutting vehicle has been vulnerable to pieces of the plants being cut flying off and being tossed toward the driver by the blades. Therefore, the primary object of this invention is to provide an improved type of corn topper which will trim the cornstalk just above the uppermost ear of the corn, and which is so designed, that the driver cannot possibly be injured because of pieces of the cut stalk being thrown by the action of the blade.

Another disadvantage of the cutting type of farm implements known heretofore in the art, has been the fact that the speed of the cutters necessarily depended upon the speed of the engine driving the vehicle. Furthermore, since most of these vehicles used a mechanical linkage between the engine driving the vehicle, and the cutter, any time that the cutter would be jammed, a resulting breakage of the parts would be occasioned because of the undue stresses and strains exerted on the machine. Therefore, another important object of this invention is to provide a farm implement which has cutters, which may be rotated at a constant speed independent of the speed of the engine from which the power for the machine is originated.

Another object of this invention is to provide a self-propelled electric cutter in a farm implement, which will force the plants to be shed toward the ground.

Another object of this invention is to provide an improved type of farm vehicle having an electrical cutter, wherein new and novel means are used for adjusting the vertical position of the blades, these new means making the adjustment easier and quicker than known heretofore in the art.

A still further object of this invention is to provide an implement for the farm, having means for guiding the plants to be cut, into the cutting zone of the blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an elevational plan view of a portion of the front section of the implement, illustrating the folded position of the cutter supports and guides therefor;

Figure 5 is an enlarged elevational view of a portion of the implement, illustrating the details of the vertical adjustment linkage for the cutters; and Figure 6 is an enlarged horizontal sectional view taken substantially along the plane defined by reference line 6—6 of Figure 1, illustrating the details of construction of the cutter support and the frame of the vehicle.

Figure 1:
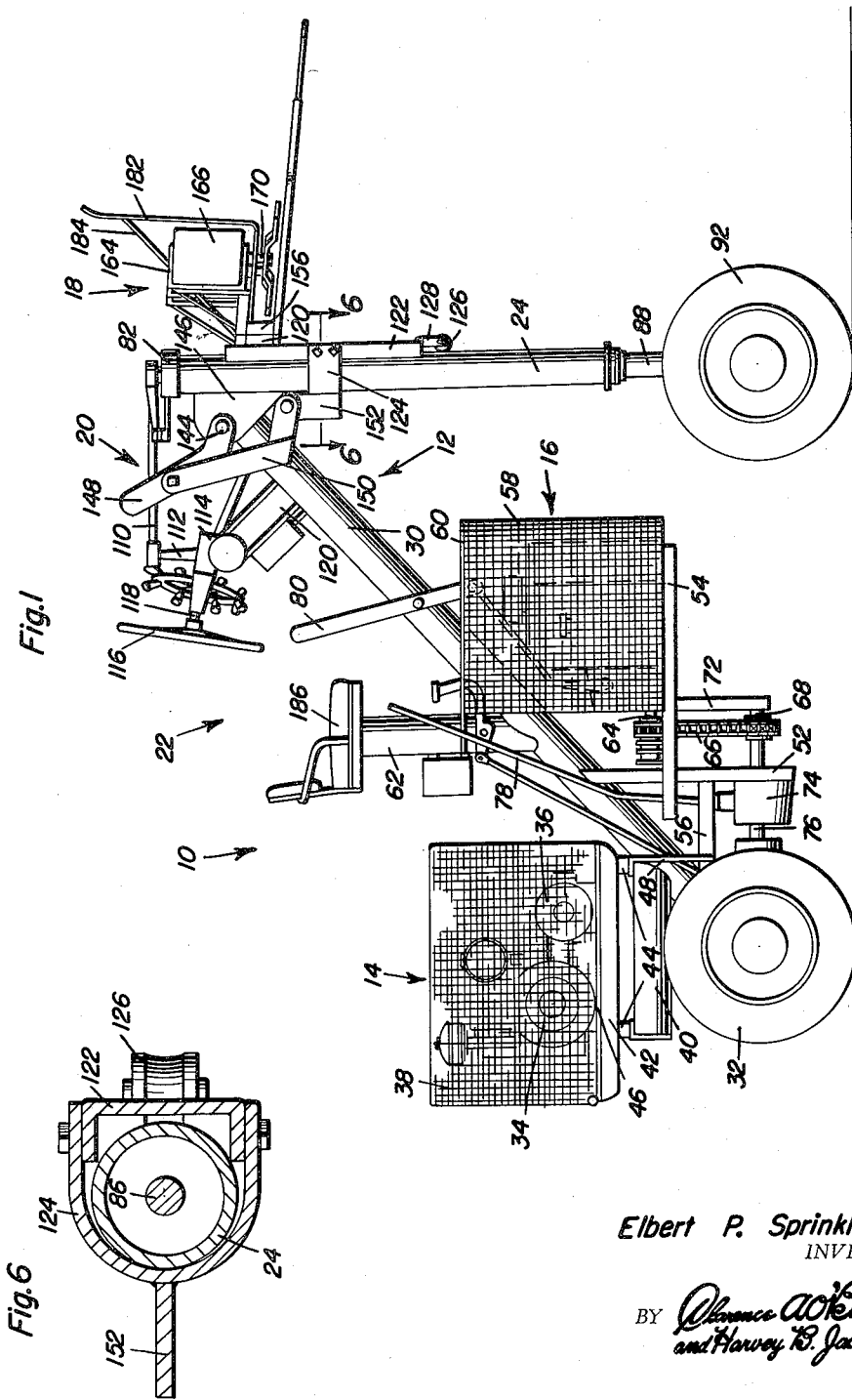
Figure 1 is a side elevational view of the farm implement comprising the present invention.

Referring now more specifically to the drawings, the numeral 10 generally designates the farm implement comprising the self-propelled electric cutter which is the subject of the present invention. This implement generally comprises a main frame 12, an engine 16 for propelling said frame, a generator 14, a cutter section 18, a vertical adjusting means 20 for varying the vertical height of cutter means 18, and a cab section 22 which accommodates the driver of this implement.

The main frame of the vehicle designated by numeral 12, is comprised of two hollow, parallel, vertical members 24 and 26, connected together at their upper ends by a horizontal beam 28, and a central beam 30 connected to the medial portion of beam 28, and extending downwardly and rearwardly therefrom. At the lower end of beam 30 a pair of wheels are rotatably fastened, in any suitable manner. These two rear wheels are connected on a single axle, with no differential, giving added traction and lessening the possibility of the vehicle getting stuck. A self-powered generator 14 is mounted on the rear of the vehicle. The generator as illustrated consists of an internal combustion engine 34, driving an electric generator 36, and a mesh screen 38 covering the two for protection. An extension beam 40 horizontally mounted at the lower end of main beam 30, supports the generator through angle irons 42, lugs 44, and platform 46 mounted thereon. Looking now more particularly at Figure 1, it may be seen that depending straps 48 are inclined downwardly and inwardly from the forward edges of the generator support, and they reinforce angle irons 56.

An internal combustion engine 16, which propels the vehicle, is mounted forwardly of generator 14. Brackets 52 depend downwardly from the lower portion of main beam 30 at a point just forwardly of the generator 14. Horizontal angle irons 54 are attached to vertical members 52, and extend forwardly therefrom. Other horizontal angle irons 56 extend from the lower portion of beam 30 to vertical members 52 adding support thereto. The horizontal angle irons 54 acts as the base support for internal combustion engine 16. This engine is surrounded by a mesh covering 58 similar to covering 38 encircling the generator and motor therefor. Further braces (not shown) are located inside the mesh covering 58, and act to further support the engine 16, since they are depending downwardly from main beam 30. A metal covering 60 encloses the upper portion of the mesh covering 58, and thus the engine 16 also. This covering 60 also acts as the floorboard for the driver of the vehicle, since this covering 60 constitutes the floor of cab 22. As can be seen in Figure 1, the main beam 30 passes through an opening in floorboard 60, and a seat support 62, extending vertically upwardly from main beam 30, also passes through the floorboard 60.

A power-drive shaft 64 extends rearwardly and outwardly from engine 16. This shaft 64 by means of chain drive 66 drives another shaft 68, which is journaled at one end in bearing 70, which is supported by inwardly and downwardly extending straps 72 attached at their upper ends to angle irons 54. This shaft 68 is the input shaft into variable speed transmission 74, which is supported by vertical member 52 and an output shaft 76 extends therefrom, and is journaled in bearing 50. This output shaft 76 is connected through conventional means so as to be drivingly connected to wheels 32. A gear lever 78 extends upwardly from variable speed transmission 74, and the upper end of this lever 78 constitutes a part of the cab section 22, since the lever is located near the driver's seat. A clutch lever 80 is also located in the cab section, within easy access for the driver, and this clutch lever 80 is connected through a linkage, to a clutch in the internal combustion engine 16, between the crankshaft of engine 16, and power shaft 64. Thus, clutch lever 80 will control shafts 64 and 68 as to whether or not they rotate. Furthermore, lever 78 will control the variable speed transmission, so as to change the gear ratios of output to input shafts, as well as allowing the vehicle to be driven in reverse.

Figure 2:
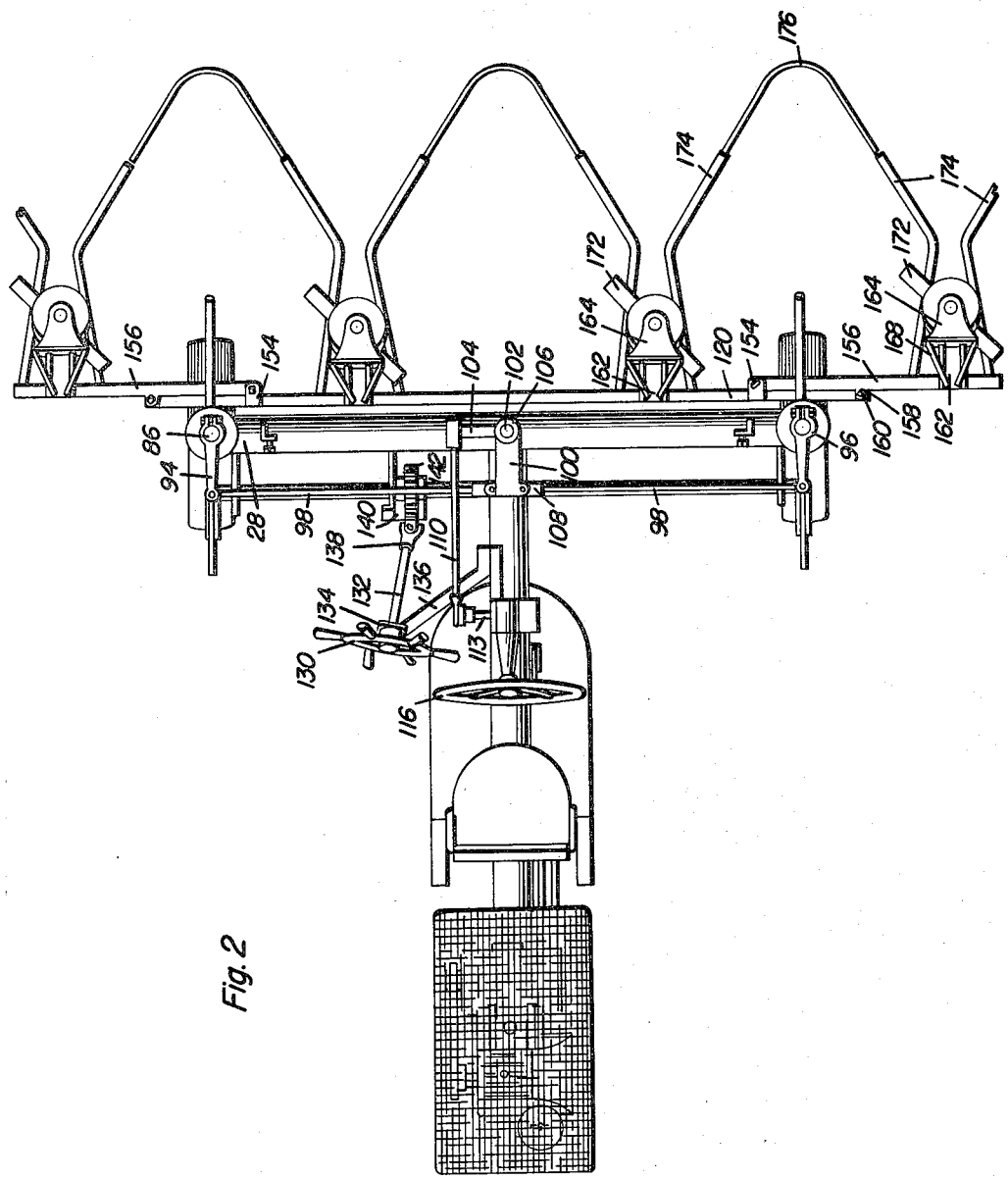
Figure 2 is an elevational plan view of the implement comprising the present invention, illustrating the relation of the plant guides to the cutters.
Figure 3:
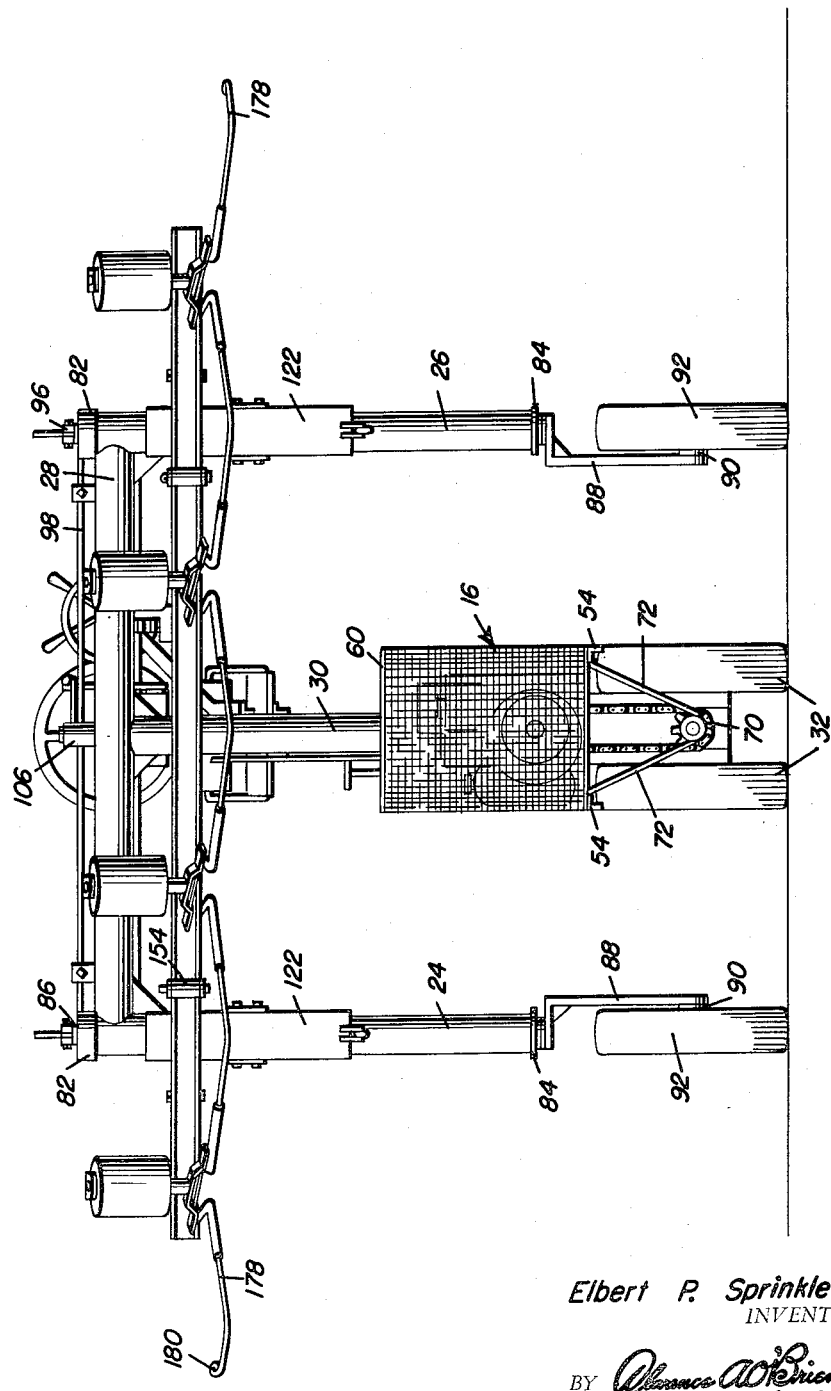
Figure 3 is a front elevational view of the device comprising the present invention, illustrating the relative height of the cutters from the wheels of the vehicle.

The steering mechanism for the vehicle will now be described. At the upper and lower end of beams 24 and 26 are collars 82 and 84 respectively, each fastened to the open end of hollow tubular beams 24 and 26, and each of these collars having a central opening therethrough. The vertical shafts 86 extend vertically through vertical beams 24 and 26, and are rotatably journaled in collars 82 and 84. At the lower ends of shafts 86 are connected angle members 88 having a long vertical leg. Stub shaft 90 extends outwardly from the lower end of the elongated vertical leg of angle member 88. Wheels 92 are rotatably supported upon shaft 90. At the upper end of shaft 86 is connected a lever having an adjustable clamp 96 at one end, which is securely fastened about shaft 86 and rotates therewith. At the other ends of levers 94 are connected steering rods 98, which are pivotally connected to levers 94, and extend inwardly toward each other. A T-shaped lever 100 engages both of these steering rods at their inner ends, and this lever is pivoted about fixed shaft 102 mounted vertically on the upper end of beam 28, this lever also having a transverse portion 104. It will be noted that lever 100 has a vertical collar 106 encircling substantially all of the shaft 102. It should also be noted that T-shaped lever 100 has pivoted portions 108 which connect to steering rods 98, and it will be evident why this feature is necessary, when it is realized that lever 100 pivots about shaft 102, thus urging the steering rods 98 upwardly or downwardly as viewed in Figure 2. A connecting lever 110 transmits motion to lever 100 from vertical lever 112. This lever 112 receives its motion from a shaft 113 extending outwardly from the steering box 114. A steering wheel 116 is secured in such a position as to be easily accessible to the driver of the vehicle from the cab. The steering wheel 116 is connected to a shaft 118 which is the input shaft into the steering box 114. This motion is then transmitted through the steering box so as to urge shaft 113 into movement. A support beam 120 extends upwardly and rearwardly from the upper portion of main beam 30, and this support serves to hold the steering box 114 in position, as well as supporting the steering mechanism.

The cutter section 18 is mounted upon a horizontally mounted girder 120 which is of such a length as to project outwardly from the vertical beams 24 and 26. This girder 120 is attached to the upper end of vertically extending channel members 122. U-shaped members 124 partially encircle vertical members 24 and 26, and are attached at their outer ends to the legs of channel member 122, thus completely encircling the vertical beams 24 and 26. Guide rollers 126 supported by legs 128 are mounted in depending relation from the lower edges of channel members 122, so that the slide formed by U-shaped member 124 and channel member 122 may be movable vertically on vertical beams 24 and 26. Thus, an adjustment may be given to the height at which the cutter section 18 will be maintained. This slide is moved up and down by a mechanical linkage which will now be described. A hand wheel 130 is mounted off to one side of steering wheel 116. This wheel 130 is supported by shaft 132, which is rotatably journaled in bearing portion 134 of support 136, which is attached to, and extends upwardly from, the main support beam 30. On the end of shaft 132 is a universal joint 138, which supplies motion to a gear box 140, which then drives gear 142, mounted on a rotatable shaft 144. The ends of shaft 144 are journaled in wing plate 146 which extends rearwardly from each of vertical beams 24 and 26. At the outer ends of shaft 144, located outwardly of wing sections 146, are levers 148 locked to shaft 144 so as to rotate therewith. Another link 150 is pivotally connected to the upper portion of link 148, and is pivotally connected at its lower end, to a plate 152, which is connected to the bight portion of U-shaped member 124, which encircles each of vertical beams 24 and 26. Thus, it may be seen, that by rotating hand wheel 130, the shaft 132 will rotate and put an input motion into gear box 140, which is transferred to gear 142 and causes this gear to rotate. Upon rotation of gear 142, the shaft 144 rotates therewith. This will cause the outer end of link 148 to move in an arcuate path, and carry with it the upper end of link 150. The resulting action is to urge plate 152 either upwardly or downwardly, thus either raising or lowering the slide upon vertical beams 24 or 26, and so, altering the height of cutter section 18, with respect to the wheels.

Near the outer end of girder 120, is fastened a hinge 154, which pivotally connects girder extensions 156, to the main girder 120. Looking now at Figure 2 in particular, it may be seen that by means of rearwardly extending flanges 158, having openings therethrough, and bolts 160, these girder extensions 156 may be locked in the open position, by passing the bolt 160 through extension flanges 158, which also extend through the outer ends of girder 120 and a nut may be secured on the other end of the bolt, thus rigidly locking the girder extensions 156 in open position. Of course, it will be realized, that by removing the bolts 160, the girder extensions 156 may be folded or pivoted forwardly and inwardly, so as to take the position shown in Figure 4, whereby the vehicle will not take up as much width as when it is in operation, and may thus be adapted for easier storage. Motor support sections 162 are connected in the spaced apart relation and extend forwardly from girder 120 and extensions 156. Connected to motor supports 162 are channel-like motor holding members 164, which are connected to motor 166 on its top and bottom, so as to hold the motor rigidly in place. Braces 168 are connected between motor support 162 and the motor holder 164, so as to give added support. The motors themselves have downwardly depending drive shafts 170 extending therefrom, on the bottom of which are connected cutter blades 172 which act to cut the top of the cornstalks as they rotate, by being driven by motor shafts 170. Stalk guides are connected to the lower end of the girder and extend forwardly of the motors. These guides comprise hollow tubular sections 174 extending outwardly from either side of each of the motors. A plurality of V-shaped rod members 176 are inserted into the outer ends of tubular members 174 so as to present a rounded surface to the stalks. Thus, the stalk guides 174 and 176, urge any cornstalks which are out of line, into the cutting zone of the blades 172.

The end rods 178 have their outer ends curved inwardly as can be seen at 180, since there is no tubular member 174 to which they may be inserted. Illustrated in Figure 1, as being supported by motor supports 162, is an L-shaped deflector 182 which extends horizontally and forwardly of the motors 166, and then is bent upwardly thus forwardly of the motors, and has a forwardly curved upper surface. This deflector is used to shed the cornstalks toward the ground after the cutting has taken place.

Inclined supports 184 extending forwardly and upwardly from the girder section 120, act to support the deflector 182 periodically along its length.

Since all of the motors 166 are electric motors, which will give the blades 172 a constant rotation, they will be supplied with electric energy from generator 36.

When it is desired to bring the vehicle into operation, it is necessary to start the internal combustion engine 16 which propels the vehicle, as well as engine 34 which drives the generator 36 to supply electricity to electric motors 166. Then the operator, while seated in seat 186, may engage the clutch 80 and by means of lever 78 put the transmission into gear, thus driving the rear wheels 32. Of course, it will be realized that cutter section 18 must first be adjusted to the proper height, so as to cut the cornstalks just above the upermost ear of corn. As can be seen in Figure 1, the hole cutter section designated by numeral 18, is tilted at a small angle, approximately 5°, forwardly and downwardly with respect to the vehicle. This has the effect of allowing clearance of the cutters, after they have cut the stalks of corn, as well as preventing the ends of the stalks which have been cut, from being thrown backwardly and rearwardly into the operator so as to injure him.

Since the corn is usually planted in equidistant rows, it will be realized that the machine may be driven so that each of the motors 166 lies above the row of corn. Then, when any stalks of corn have been planted and are not exactly in the row, the guides 174 will urge the upper ends of the stalks into the cutting zone of the blades. All of the necessary adjustments and drive mechanisms can be controlled by the operator seated in seat 186, of cab 22. When the machine is to be taken out of use and stored someplace, the front end of the machine is too wide for practical storage, so girder extensions 156 may be folded inwardly and forwardly as shown in Figure 4, so as to take up less space.

It is to be noted that all of the motors 166 operate independently of each other and each motor has its own switch box and fuses so that motors 166 may be selectively and independently put into and taken out of operation.

It may now be seen that I have invented and shown and described herein, a new and novel type of self-propelled electric cutter for farm use, which has new features in that the cutters are at a slight angle, so that they have clearance from the cornstalks after they have done the cutting action, and for that reason the cut pieces will not be thrown back into the operator. Furthermore, this device has the added feature, of having electric motors 166 to drive the cutters 172, so that a constant cutting speed may be maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An agricultural implement for topping corn comprising a wheeled, self-propelled vehicle frame, an operator control station located centrally of said frame for controlling the implement therefrom, said frame having forward wheels and rear wheels, vertical members rising from said forward wheels and constituting a portion of said frame, a horizontal support mounted on said vertical members, a plurality of cutter units affixed to said horizontal support having cutter blades disposed for rotational movement in a plane forming an acute angle with the horizontal, said plane being inclined forwardly and downwardly so the blades have clearance after cutting and at such an angle that any cuttings which are hurled rearwardly by the blades will avoid the operator control station, said cutter blades being disposed forwardly of the forward wheels.

2. An agricultural implement for topping corn comprising a wheeled, self-propelled vehicle frame, an operator control station located centrally of said frame for controlling the implement therefrom, said frame having forward wheels and rear wheels, vertical members rising from said forward wheels and constituting a portion of said frame, a horizontal support mounted on said vertical members, a plurality of cutter units affixed to said horizontal support having cutter blades disposed for rotational movement in a plane forming an acute angle with the horizontal, said plane being inclined forwardly and downwardly so the blades have clearance after cutting and at such an angle that any cuttings which are hurled rearwardly by the blades will avoid the operator control station, said cutter blades being disposed forwardly of the forward wheels, means slidably mounting said horizontal support on said vertical members so that the height of the cutter blades may be varied, means operable from said control station for moving said support on said members.

3. A corn topping implement comprising a frame having a pair of front side ground wheels, said frame including a pair of upright members rising from said wheels, a horizontal transverse support in front of said upright members, a plurality of corn topping cutter units mounted on said support and spaced apart longitudinally thereof, slide means fixed to said support and slidably adjustable upwardly and downwardly on said upright members to correspondingly adjust said support for varying the height of the cutter units from the ground, a hand wheel rotatably mounted on said frame in the rear of said upright members, and means operatively connecting said hand wheel to said slide means for adjusting the slide means in unison.

4. The combination of claim 3, said last-named means comprising a cross-shaft journalled on said upright members for rotation in opposite directions, respectively, by said wheel, and linkages on said cross-shaft pivotally connected to said slide means for adjusting said slide means upwardly and downwardly in response to rotation of said shaft in opposite directions.

References Cited in the file of this patent

UNITED STATES PATENTS

| | | |
|---|---|---|
| 2,163,849 | Pfister | June 27, 1939 |
| 2,505,952 | Fergason | May 2, 1950 |
| 2,526,543 | Davies | Oct. 17, 1950 |
| 2,648,943 | Shafer et al. | Aug. 18, 1953 |